(12) United States Patent
Nannra et al.

(10) Patent No.: US 10,476,682 B2
(45) Date of Patent: Nov. 12, 2019

(54) TRANSACTION MANAGEMENT IN DISTRIBUTED LEDGER SYSTEMS

(71) Applicant: Cisco Technology, Inc., San Jose, CA (US)

(72) Inventors: Anoop Nannra, Santa Clara, CA (US); Judith Ying Priest, Palo Alto, CA (US); Ramanathan Jagadeesan, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 15/447,001

(22) Filed: Mar. 1, 2017

(65) Prior Publication Data

US 2018/0254841 A1 Sep. 6, 2018

(51) Int. Cl.
| | | |
|---|---|---|
| *G06F 1/12* | (2006.01) | |
| *G06F 13/42* | (2006.01) | |
| *H04L 5/00* | (2006.01) | |
| *H04L 7/00* | (2006.01) | |
| *H04L 9/32* | (2006.01) | |
| *H04L 29/06* | (2006.01) | |
| *H04L 9/12* | (2006.01) | |
| *H04L 29/08* | (2006.01) | |
| *G06F 1/14* | (2006.01) | |

(52) U.S. Cl.
CPC ............ *H04L 9/3297* (2013.01); *G06F 1/14* (2013.01); *H04L 9/12* (2013.01); *H04L 9/3236* (2013.01); *H04L 67/10* (2013.01); *H04L 69/28* (2013.01); *H04L 2209/38* (2013.01)

(58) Field of Classification Search
CPC ...... H04J 3/0661; H04L 69/28; H04L 43/065; H04L 43/04; H04L 9/3297
See application file for complete search history.

(56) References Cited

U.S. PATENT DOCUMENTS

| | | | |
|---|---|---|---|
| 6,446,092 B1 | 9/2002 | Sutter | |
| 6,654,356 B1 * | 11/2003 | Eidson | .................. H04J 3/0661 370/303 |
| 8,972,491 B2 | 3/2015 | Abu-Libdeh et al. | |
| 9,075,841 B2 | 7/2015 | Larson et al. | |

(Continued)

*Primary Examiner* — Xuxing Chen
(74) *Attorney, Agent, or Firm* — Behmke Innovation Group LLC; James Behmke; Stephen D. LeBarron

(57) ABSTRACT

In various implementations, a method of managing transactions in a distributed ledger is performed by a first network node that is configured to maintain a distributed ledger in coordination with a plurality of network nodes. In various implementations, the first network node includes a processor, a non-transitory memory, and a network interface. In various implementations, the method includes synchronizing a first clock of the first network node with respective clocks maintained by one or more of the plurality of network nodes. In various implementations, the method includes obtaining a transaction indicator including respective transaction data. For example, in some implementations, the method includes receiving a transaction request from a client device. In various implementations, the method includes synthesizing, by the first network node, a timestamp for the transaction based on the first clock. In some implementations, the timestamp indicates a time that associates the first network node to the transaction.

20 Claims, 8 Drawing Sheets

(56) References Cited

U.S. PATENT DOCUMENTS

| | | |
|---|---|---|
| 9,203,600 B1 | 12/2015 | Hochschild et al. |
| 2016/0358187 A1* | 12/2016 | Radocchia ......... G06Q 30/0185 |
| 2017/0170921 A1* | 6/2017 | Brown ...................... G06F 1/14 |
| 2017/0288879 A1* | 10/2017 | Quinlan .................. G06F 21/31 |
| 2019/0050856 A1* | 2/2019 | Vintila ............... G06Q 20/3829 |

* cited by examiner

US 10,476,682 B2

TRANSACTION MANAGEMENT IN DISTRIBUTED LEDGER SYSTEMS

TECHNICAL FIELD

The present disclosure relates generally to transaction management, and in particular, to transaction management in distributed ledger systems.

BACKGROUND

Many traditional storage systems are centralized storage systems. In such storage systems, one or more servers serve as a central repository that stores information. The central repository is accessible to various client devices. The central repository is often managed by a business entity that typically charges a fee to access the central repository. In some instances, there is a transaction fee associated with each transaction. For example, there is often a transaction fee for writing information that pertains to a new transaction, and another transaction fee for accessing information related to an old transaction. As such, centralized storage systems tend to be relatively expensive. Some centralized storage systems are susceptible to unauthorized data manipulation. For example, in some instances, a malicious actor gains unauthorized access to the central repository, and surreptitiously changes the information stored in the central repository. In some scenarios, the unauthorized changes are not detected. As such, the information stored in a centralized repository is at risk of being inaccurate.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
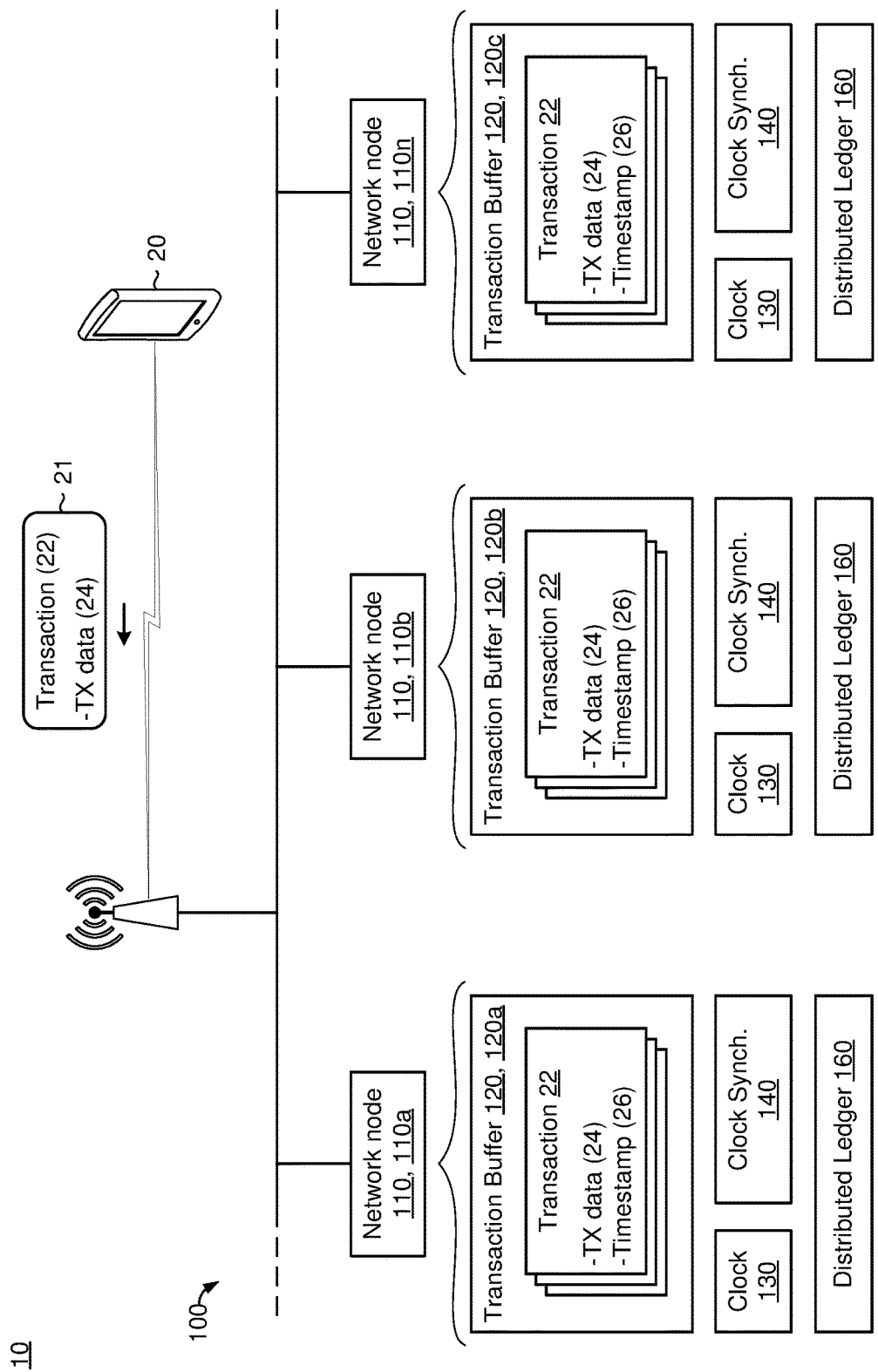
FIG. 1 is a schematic diagram of a distributed ledger environment that includes various network nodes that are configured to maintain a distributed ledger in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein enable managing transactions for a distributed ledger. For example, in various implementations, a method of managing transactions for a distributed ledger is performed by a first network node that is configured to maintain a distributed ledger in coordination with a plurality of network nodes. In various implementations, the first network node includes one or more processors, a non-transitory memory, and one or more network interfaces. In various implementations, the method includes synchronizing a first clock of the first network node with respective clocks maintained by one or more of the plurality of network nodes. In various implementations, the method includes obtaining a transaction indicator including respective transaction data. For example, in some implementations, the method includes receiving a transaction request from a client device. In various implementations, the method includes synthesizing, by the first network node, a timestamp for the transaction based on the first clock. In some implementations, the timestamp indicates a time that associates the first network node to the transaction.

Example Embodiments

FIG. 1 is a schematic diagram of a distributed ledger environment 10. While certain specific features are illustrated, those of ordinary skill in the art will appreciate from the present disclosure that various other features have not been illustrated for the sake of brevity and so as not to obscure more pertinent aspects of the example implementations disclosed herein. To that end, the distributed ledger environment 10 includes a client device 20 (e.g., a mobile communication device such as a smartphone, tablet computer, or a laptop computer), and a distributed ledger system 100. In various implementations, the distributed ledger system 100 includes various network nodes 110 (e.g., a first network node 110a, a second network node 110b . . . an nth network node 110n) that are configured to maintain a distributed ledger 160 in coordination with each other.

In various implementations, the client device 20 sends a transaction request 21 to the distributed ledger system 100. In various implementations, the transaction request 21 includes information associated with a transaction 22. For example, in some implementations, the transaction request 21 includes transaction data 24 that specifies details of the transaction 22. In some implementations, the transaction 22 includes a request to transfer ownership of an asset (e.g., a digital asset such as a digital currency, and/or ownership of a physical asset such as a vehicle) between the client device 20 and another client device (not shown). In some examples, the transaction 22 is a money transfer request between the client device 20 and the other client device. In such examples, the transaction data 24 includes a wallet address of the client device 20, a wallet address of the other client device, and an amount. In some examples, the transaction 22 is a purchase for an item. In such examples, the transaction data 24 indicates the item, a price for the item, and a wallet address of the client device 20.

In various implementations, the distributed ledger system 100 receives the transaction request 21. For example, in some implementations, the network nodes 110 receive the transaction request 21. In some implementations, the network nodes 110 receive the transaction request 21 directly from the client device 20. However, in some implementations, some of the network nodes 110 receive the transaction request 21 through another network node 110. More generally, in various implementations, a network node 110 obtains a transaction indicator (e.g., the transaction request 21) including respective transaction data (e.g., the transaction data 24). In some implementations, the network node 110 obtains the transaction indicator directly from the client device 20. In some implementations, the network node 110 obtains the transaction indicator through another network node 110.

In various implementations, the network nodes 110 maintain the distributed ledger 160 in coordination with each other. In various implementations, the network nodes 110 store transactions 22 in the distributed ledger 160. As such, in various implementations, the distributed ledger 160 serves as a record of the transactions 22 that the distributed ledger system 100 receives, validates, and/or processes. In various implementations, a network node 110 (e.g., each network node 110) stores a copy of the distributed ledger 160. As such, in various implementations, there is no need for a centralized ledger. In some implementations, several network nodes 110 (e.g., all the network nodes 110) receive the transaction request 21, and one of the network nodes 110 initiates the storage of the transaction 22 in the distributed ledger 160.

In various implementations, a network node 110 includes a pending-transactions buffer 120 ("transaction buffer 120", hereinafter for the sake of brevity), a clock 130, a clock synchronizer 140, and a copy (e.g., an instance) of the distributed ledger 160. In various implementations, a network node 110 receives the transaction request 21 from the client device 20, and stores the transaction 22 in the transaction buffer 120. In some implementations, a network node 110 stores the transaction 22 in the transaction buffer 120 until the transaction 22 is stored in the distributed ledger 160 by one of the network nodes 110. In various implementations, the network node 110 purges the transaction 22 from the transaction buffer 120 in response to the transaction 22 being stored in the distributed ledger 160. As such, in various implementations, the transaction buffer 120 stores transactions 22 that are pending storage (e.g., not currently stored) in the distributed ledger 160. In various implementations, the transaction buffer 120 includes a non-transitory memory. In other words, in various implementations, the transaction buffer 120 is stored in a non-transitory memory. Those of ordinary skill in the art will appreciate from the present disclosure that, in various implementations, the transaction buffer 120 is referred to as a pending-transactions pool and/or a transaction pool.

In various implementations, a network node 110 synthesizes a transaction timestamp 26 ("timestamp 26", hereinafter for the sake of brevity) for the transaction 22 based on the clock 130. In other words, in various implementations, a network node 110 utilizes the clock 130 to generate the timestamp 26. In various implementations, the timestamp 26 indicates a time that associates the transaction 22 with the network node 110. In some implementations, the timestamp 26 indicates a time at which the network node 110 received the transaction 22. In some implementations, the timestamp 26 indicates a time at which the network node 110 validated the transaction 22. In various implementations, the clocks 130 maintained by the network nodes 110 are synchronized with each other. In various implementations, a network node 110 includes a clock synchronizer 140 that synchronizes the clock 130 of the network node 110 with other clocks 130 maintained by other network nodes 110. For example, in some implementations, the clock synchronizer 140 of the first network node 110a synchronizes the clock 130 of the first network node 110a with other clocks 130 maintained by other network nodes 110. As will be discussed herein, the clock synchronizer 140 utilizes a variety of techniques to synchronize the clock 130 with other clocks 130 in the distributed ledger system 100.

Figure 2A:
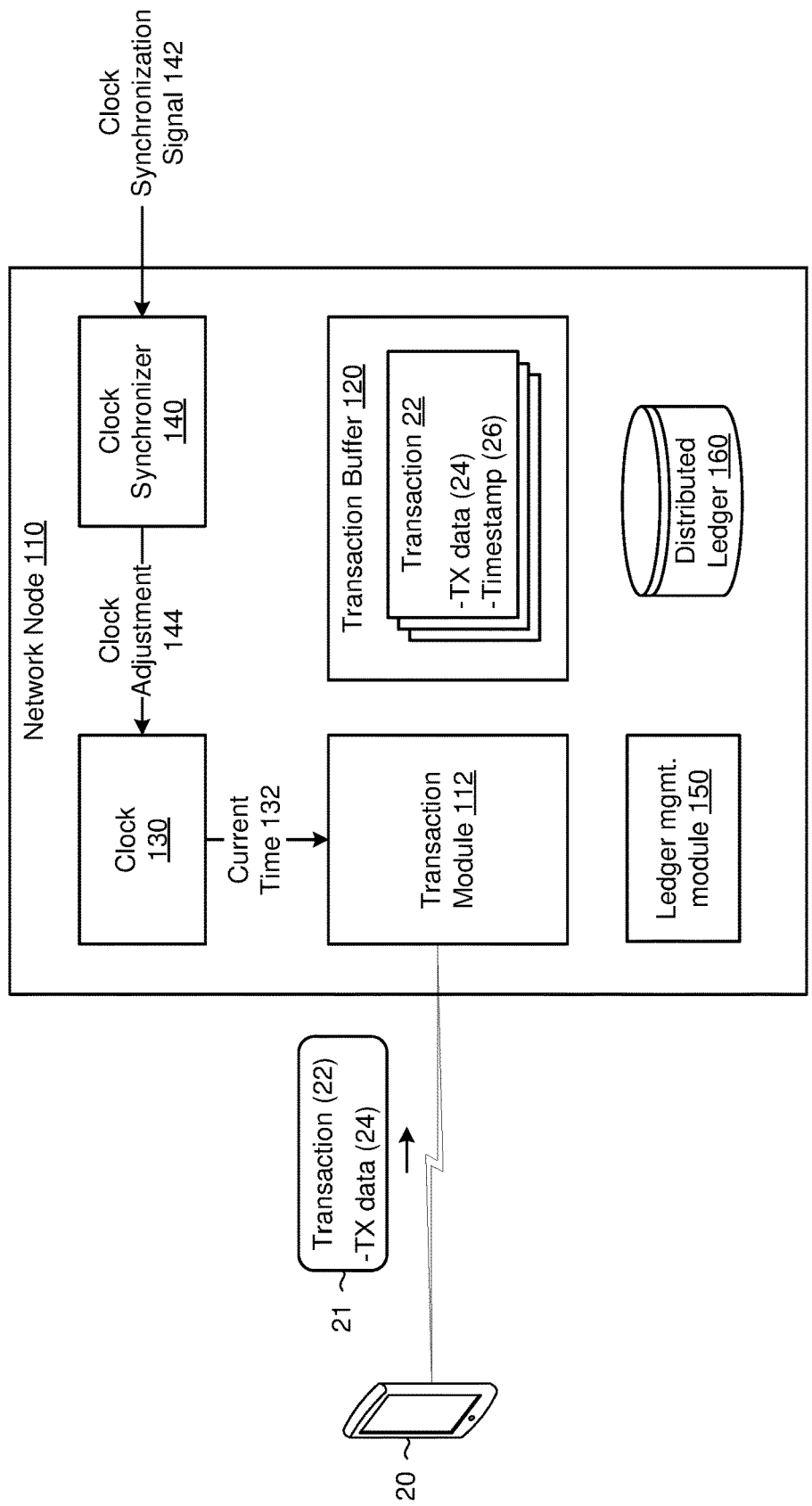
FIGS. 2A-C are block diagrams of a network node in accordance with some implementations.

FIG. 2A is a block diagram of a network node 110 in accordance with some implementations. In various implementations, a network node 110 includes a transaction module 112, a transaction buffer 120, a clock 130, a clock synchronizer 140, a ledger management module 150, and a copy of the distributed ledger 160. In various implementations, the transaction module 112 manages the transactions 22. In various implementations, the transaction module 112 obtains a transaction indicator (e.g., the transaction request 21) that includes the transaction data 24 for a transaction 22. For example, in some implementations, the transaction module 112 receives the transaction request 21 from the client device 20.

In various implementations, the transaction module 112 synthesizes a timestamp 26 for the transaction 22 based on the clock 130. In various implementations, the timestamp 26 indicates a time that associates the network node 110 with the transaction 22. For example, in some implementations, the transaction module 112 obtains a current time 132 from the clock 130 in response to receiving the transaction request 21. As such, in some implementations, the timestamp 26 indicates a time at which the network node 110 received the transaction 22 from the client device 20. In various implementations, the network node 110 validates the transaction 22. For example, in some implementations, the network node 110 determines whether the transaction 22 includes sufficient transaction data 24 to be processed. In other words, in some implementations, the network node 110 determines whether the transaction 22 includes sufficient transaction data 24 to be stored in the distributed ledger 160. In some implementations, the transaction module 112 obtains the current time 132 in response to validating the transaction 22. As such, in some implementations, the timestamp 26 indicates a time at which the network node 110 validated the transaction 22.

In various implementations, the transaction module 112 stores the transaction 22, and the timestamp 26 for the transaction 22, in the transaction buffer 120. In various implementations, the transaction buffer 120 stores transactions 22 that have not been stored (e.g., recorded) in the distributed ledger 160. In other words, in various implementations, the transaction buffer 120 stores transactions 22 that are pending storage into the distributed ledger 160. In various implementations, the transactions 22 are purged (e.g., removed) from the transaction buffer 120 after the transactions 22 are stored in (e.g., added to) the distributed ledger 160.

In various implementations, the transaction module 112 synthesizes a digital signature that is associated with the timestamp 26. In some implementations, the transaction module 112 synthesizes the digital signature by cryptographically signing the timestamp 26, or a hash of the timestamp 26. In some implementations, the transaction module 112 utilizes a private key of a private-public key pair to synthesize the digital signature. As such, in various implementations, other network nodes 110 verify the authenticity of the digital signature with the public key of the private-public key pair.

In various implementations, the clock synchronizer 140 synchronizes the clock 130 of the network node 110 with clocks 130 maintained by other network nodes 110 in the distributed ledger system 100. In some implementations, the clock synchronizer 140 receives a clock synchronization signal 142. In such implementations, the clock synchronizer 140 determines a clock adjustment 144 for the clock 130 based on the clock synchronization signal 142. In some implementations, the clock synchronizer 140 determines whether the clock 130 is unsynchronized based on the clock synchronization signal 142. For example, the clock synchronizer 140 determines whether the current time 132 is different from a time indicated by the clock synchronization signal 142. In this example, if the current time 132 is the same as the time indicated by the clock synchronization signal 142, then the clock synchronizer 142 determines that the clock 130 is synchronized. However, if the current time 132 is different from the time indicated by the clock synchronization signal 142, then the clock synchronizer 142 determines that the clock 130 is unsynchronized.

In various implementations, the clock synchronizer 140 determines the clock adjustment 144 in response to determining that the clock 130 is unsynchronized. In some examples, the clock adjustment 144 adjusts the clock 130 such that the current time 132 is in sync with the time indicated by the clock synchronization signal 142. In various implementations, the clock synchronizer 140 adjusts the time indicated by the clock synchronization signal 142 to account for network latency. In various implementations, the network node 110 receives the clock synchronization signal 142 from another network node 110. For example, in some implementations, one of the network nodes 110 is designated to maintain a root timing reference. In such implementations, the designated network node 110 synthesizes the clock synchronization signal 142 based on the root timing reference, and transmits the clock synchronization signal 142 to other network nodes 110 in the distributed ledger network 100. In some implementations, the network nodes 110 select one of the network nodes 110 to maintain the root timing reference based on consensus between the network nodes 110.

In various implementations, the clock synchronizer 140 utilizes the Precision Time Protocol (PTP) to synchronize the clock 130 with clocks 130 maintained by other network nodes 110. In other words, in various implementations, the clock 130 is synchronized in accordance with techniques defined in the IEEE 1588 standard (e.g., the IEEE 1588-2002 standard, the IEEE 1588-2008 standard, and/or a variant thereof). More generally, in various implementations, the distributed ledger system 100 utilizes the Precision Time Protocol (PTP) to synchronize the clocks 130. In some implementations, the clock synchronizer 140 utilizes the Network Time Protocol (NTP) to synchronize the clock 130. In some implementations, the clock synchronizer 140 utilizes the Global Positioning System (GPS) to synchronize the clock 130. In some implementations, the clock synchronizer 140 utilizes cell towers to synchronize the clock 130. Those of ordinary skill in the art will appreciate from the present disclosure that the clock synchronizer 140 utilizes a variety of techniques to synchronize the clock 130.

Figure 2B:
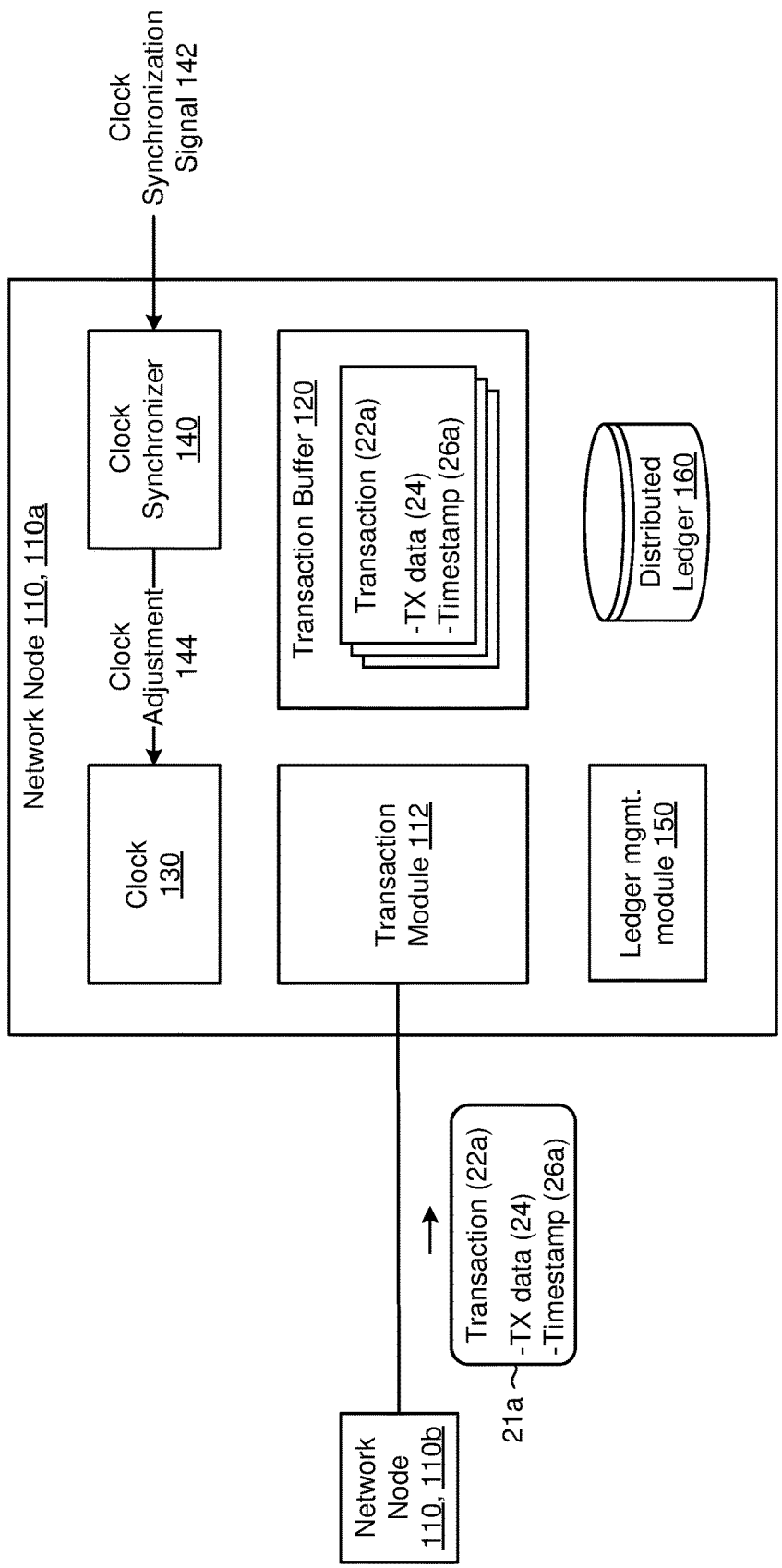

FIG. 2B is a block diagram of a network node 110 (e.g., a first network node 110a) in accordance with some implementations. In some implementations, the network node 110 receives a transaction request 21a for a transaction 22a from another network node (e.g., the second network node 110b). In some implementations, the transaction request 21a includes a timestamp 26a that was generated by another network node 110 (e.g., by the second network node 110b). In such implementations, the transaction module 112 stores the transaction 22a, and the timestamp 26a, in the transaction buffer 120. In some implementations, the transaction module 112 verifies the authenticity of the timestamp 26a. For example, the transaction module 112 utilizes a public key associated with the second network node 110b to determine whether a digital signature associated with the timestamp 26a was generated with a private key corresponding with the public key. In such implementations, if the transaction module 112 successfully verifies the authenticity of the timestamp 26a, then the transaction module 112 stores the transaction 22a, and the timestamp 26a, in the transaction buffer 120. However, if the transaction module 112 determines that the timestamp 26a is not authentic, then the transaction module 112 synthesizes a timestamp for the transaction 22a (e.g., the timestamp 26 shown in FIG. 2A).

Figure 2C:
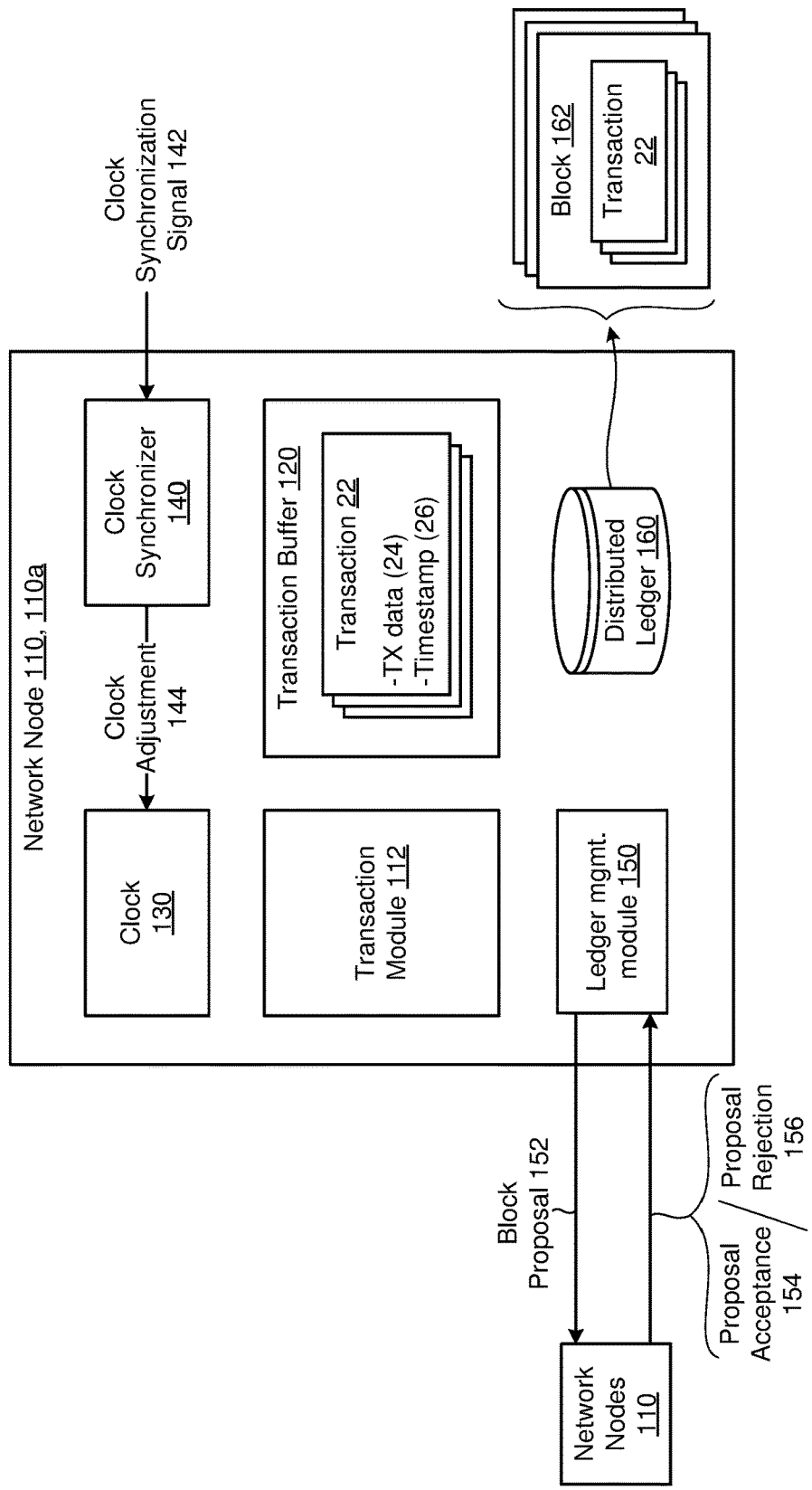

FIG. 2C is a block diagram of a network node 110 (e.g., a first network node 110a) in accordance with some implementations. In various implementations, the distributed ledger 160 stores various blocks 162. In various implementations, a block 162 includes a list of transactions 22. As such, in various implementations, the distributed ledger 160 serves as a record for the transactions 22 received by the distributed ledger system 100. In various implementations, a change to the distributed ledger 160 is permitted in response to determining that a majority of the network nodes 110 agree to change. In other words, in various implementations, changes to the distributed ledger 160 are permitted in response to a consensus between a majority of the network nodes 110. As such, those of ordinary skill in the art will appreciate from the present disclosure that, in various implementations, the distributed ledger 160 is considered an immutable record of transactions 22 processed by the distributed ledger system 100.

In some implementations, the ledger management module 150 synthesizes a block proposal 152 for the distributed ledger 160. In some implementations, the block proposal 152 includes the transactions 22 from the transaction buffer 120. In some implementations, the block proposal 152 includes a proposed block for the distributed ledger 160. In some implementations, the ledger management module 150 transmits the block proposal 152 to other network nodes 110 in the distributed ledger system 100. In some implementations, the ledger management module 150 receives a proposal acceptance 154 that indicates that the block proposal 152 has been accepted by a majority of the network nodes 110. In such implementations, the ledger management module 150 stores the proposed block indicated by the block proposal 152 into the distributed ledger 160. In some implementations, after storing the proposed block in the distributed ledger 160, the ledger management module 150 purges the transactions 22 that were in the proposed block from the transaction buffer 120. In some implementations, the network node 110 receives a fee (e.g., block creation fee) for adding the proposed block to the distributed ledger 160. In some implementations, the ledger management module 150 receives a proposal rejection 156 that indicates that the block proposal 152 has been rejected by a majority of the network nodes 110. In such implementations, the ledger management module 150 discards the proposed block.

In various implementations, the ledger management module 150 synthesizes the block proposal 152 by selecting transactions 22 from the transaction buffer 120 based on the timestamps 26 associated with the transactions 22. For example, in some implementations, the ledger management module 150 selects transactions 22 for the block proposal 152 on a first-in-first-out (FIFO) basis. In such implementations, the ledger management module 150 selects transactions 22 that are associated with earlier timestamps 26. In some implementations, the ledger management module 150 selects transactions 22 for the block proposal 152 on a last-in-first-out (LIFO) basis. In such implementations, the ledger management module 150 selects transactions 22 that are associated with later timestamps 26. In various implementations, the block proposal 152 has a size limit. As such, the ledger management module 150 selects transactions 22 for the block proposal 152 based on the timestamps 26. In various implementations, the ledger management module 150 orders the transactions 22 in the block proposal 152 based on the timestamps 26. For example, in some implementations, transactions 22 with earlier timestamps 26 are situated towards the beginning of the block proposal 152, and transactions 22 with later timestamps 26 are situated towards the end of the block proposal 152.

In some implementations, the ledger management module 150 utilizes a cryptographic hash function (e.g., SHA-256) to generate a digest. For example, in some implementations, the ledger management module 150 inputs the proposed block and a number (e.g., a random number or a pseudo-random number) into the cryptographic hash function to generate the digest. In some implementations, the ledger management module 150 determines whether the digest satisfies a digest criterion. In some examples, the digest criterion specifies that the digest include a particular number of leading zeros. In such examples, the ledger management module 150 determines whether the digest includes the particular number of leading zeros. In various implementations, the ledger management module 150 transmits the block proposal 152 to the other network nodes 110 in response to determining that the digest satisfies the digest criterion. In various implementations, in response to determining that the digest does not satisfy the digest criterion, the ledger management module 150 generates a new digest by selecting a different number (e.g., by incrementing the previous number).

Figure 3:
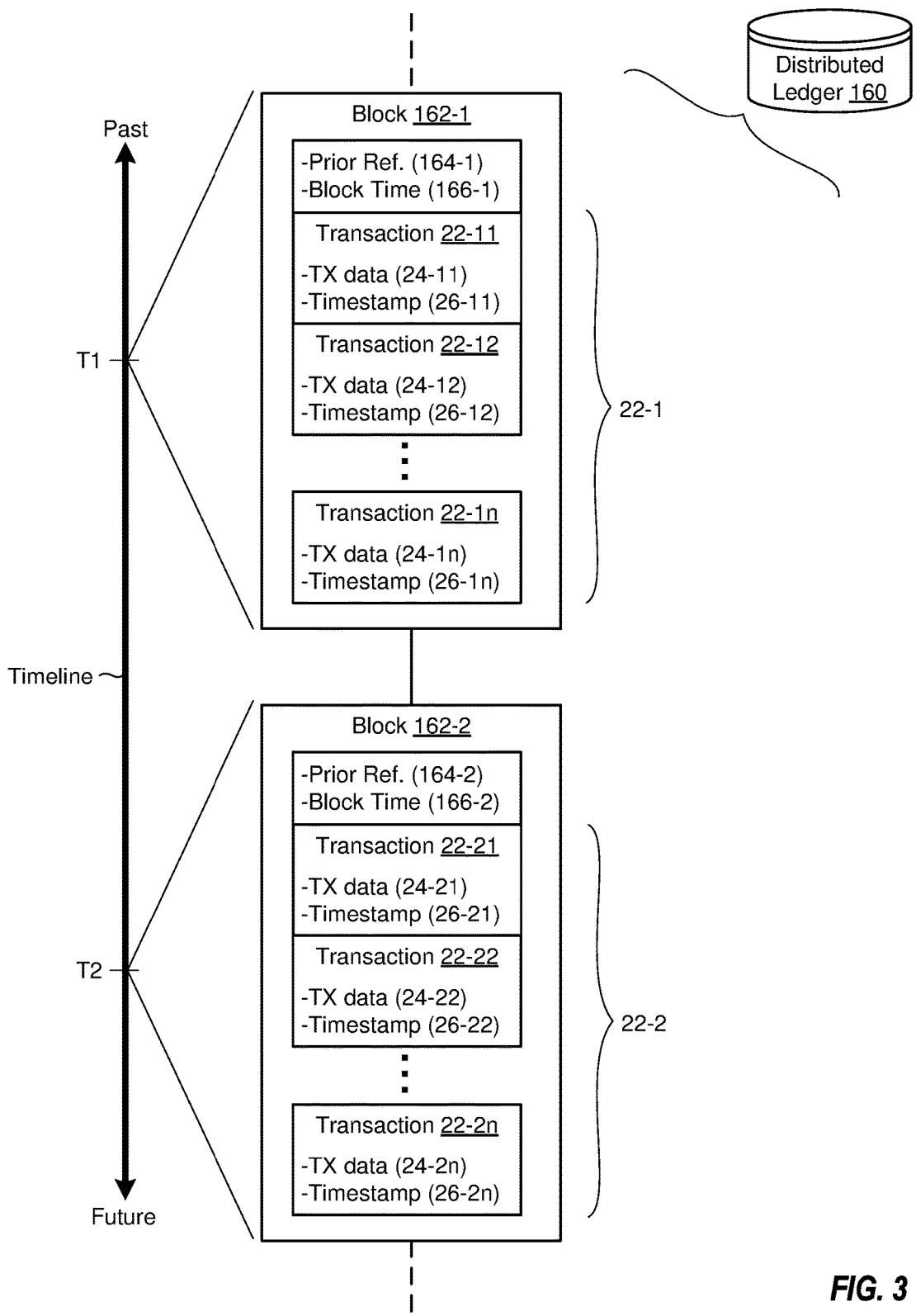
FIG. 3 is a block diagram of a distributed ledger in accordance with some implementations.

FIG. 3 is a block diagram of a distributed ledger 160 in accordance with some implementations. This example implementation illustrates a first block 162-1 and a second block 162-2. As illustrated by the timeline, the first block 162-1 was added to the distributed ledger 160 at time T1, and the second block 16-2 was added to the distributed ledger 160 at time T2. In various implementations, the distributed ledger system 100 controls a time difference between block additions by adjusting the digest criterion (e.g., by increasing/decreasing the number of leading zeros). In various implementations, the first block 162-1 includes a reference 164-1 to a prior block (not shown), and the second block 162-2 includes a reference 164-2 to the first block 162-1. In various implementations, the first block 162-1 includes a block timestamp 166-1 that indicates a time (e.g., T1) at which the first block 162-1 was added to the distributed ledger 160. Similarly, the second block 162-2 includes a block timestamp 166-2 that indicates a time (e.g., T2) at which the second block 162-2 was added to the distributed ledger 160.

In various implementations, the first block 162-1 includes a first set of transactions 22-11, 22-12 . . . 22-1*n* (collectively, transactions 22-1). The transactions 22-1 include respective transaction data 24-11, 24-12 . . . 24-1*n*, and respective timestamps 26-11, 26-12 . . . 26-1*n*. Similarly, the second block 162-2 includes a second set of transactions 22-21, 22-22 . . . 22-2*n* (collectively, transactions 22-2). The transactions 22-2 include respective transaction data 24-21, 24-22 . . . 24-2*n*, and respective timestamps 26-21, 26-22 . . . 26-2*n*. In various implementations, the timestamps 26-11, 26-12 . . . 26-2*n* represent times at which the distributed ledger system 100 received and/or validated the respective transactions 22, whereas the block timestamps 166 represents times at which the respective blocks 162 were created. As such, in various implementations, the timestamps 26-11, 26-12 . . . 26-2*n* are different from the block timestamps 166.

Figure 4A:
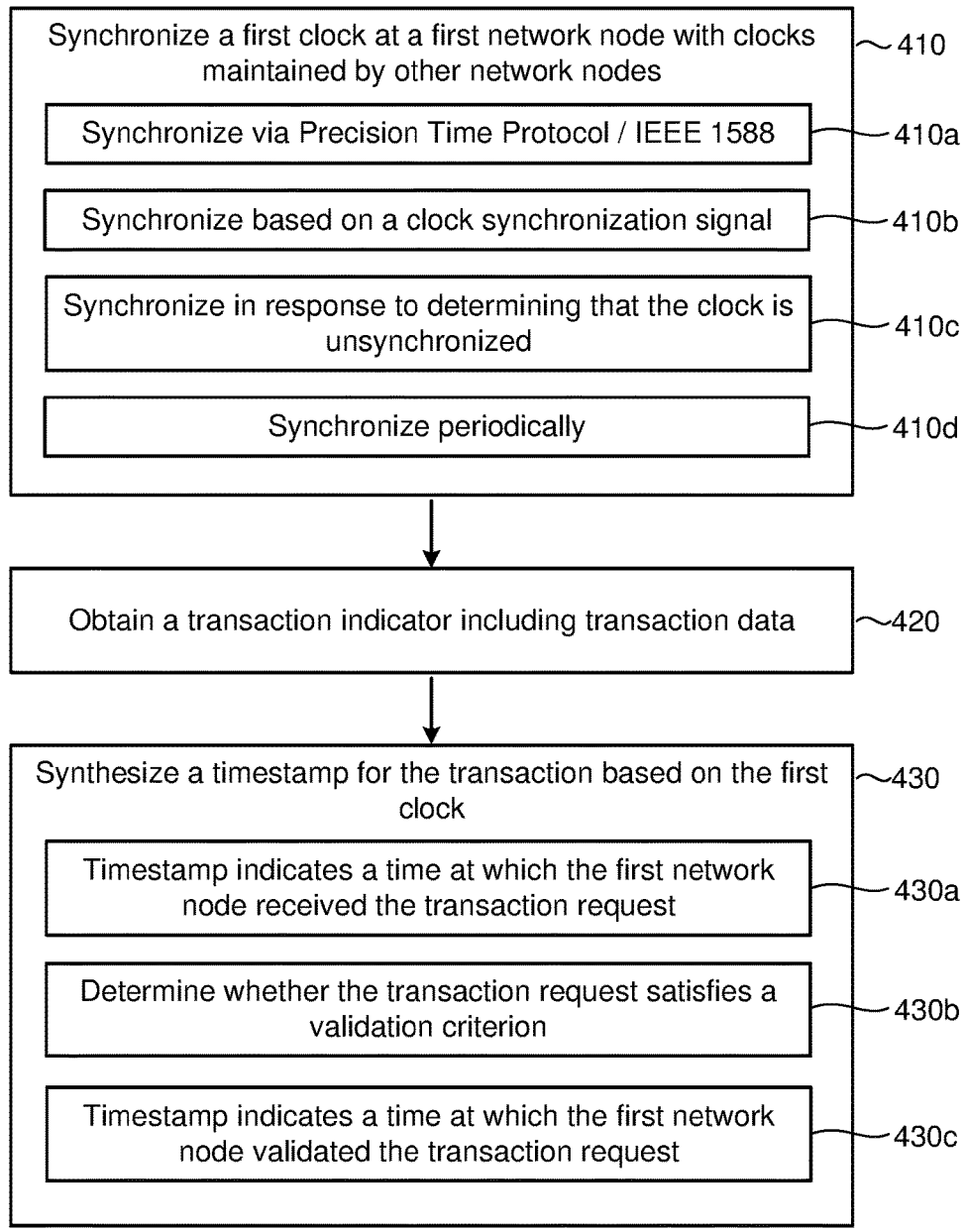
FIG. 4A is a flowchart representation of a method of synthesizing timestamps for transactions in accordance with some implementations.

FIG. 4A is a flowchart representation of a method 400 of synthesizing timestamps for transactions in accordance with some implementations. In various implementations, the method 400 is implemented as a set of computer readable instructions that are executed at a network node (e.g., the network node 100 shown in FIGS. 1 and 2A-C). In some implementations, the network node is configured to maintain a distributed ledger (e.g., the distributed ledger 160 shown in FIGS. 1-3) in coordination with other network nodes. Briefly, the method 400 includes synchronizing a clock of the network node with clocks maintained by other network nodes, obtaining a transaction indicator, and synthesizing a timestamp for the transaction based on the clock.

As represented by block 410, in various implementations, the method 400 includes synchronizing a clock of the network node (e.g., the clock 130 of the first network node 110*a* shown in FIG. 1) with clocks maintained by other network nodes (e.g., with clocks 130 maintained by network nodes 110*b* . . . 110*n*). As represented by block 410*a*, in various implementations, the method 400 includes synchronizing the clock based on techniques associated with the Precision Time Protocol (PTP). In other words, in various implementations, the method 400 includes utilizing techniques associated with the IEEE 1588 standard to synchronize the clock. Those of ordinary skill in the art will appreciate from the present disclosure that, in various implementations, the method 400 includes synchronizing the clock based on a variety of techniques (e.g., NTP, GPS, cell towers, etc.).

As represented by block 410*b*, in various implementations, the method 400 includes synchronizing the clock based on a clock synchronization signal (e.g., the clock synchronization signal 142 shown in FIGS. 2A-C). For example, in some implementations, the method 400 includes receiving the clock synchronization signal, and adjusting the clock based on a time indicated by the clock synchronization signal. As represented by block 410*c*, in various implementations, the method 400 includes synchronizing the clock in response to determining that the clock is unsynchronized. For example, in some implementations, the method 400 includes synchronizing the clock in response to a current time indicated by the clock being different from a time indicated by the clock synchronization signal. As represented by block 410*d*, in various implementations, the method 400 includes synchronizing the clock periodically (e.g., once a day, once a week, etc.).

As represented by block 420, in various implementations, the method 400 includes obtaining a transaction indicator including respective transaction data. For example, in some implementations, the method 400 includes receiving a transaction request (e.g., the transaction request 21 shown in FIG. 1). In some implementations, the method 400 includes obtaining the transaction indicator from a client device (e.g., the client device 20 shown in FIG. 1). In various implementations, the transaction request includes transaction data (e.g., the transaction data 24 shown in FIG. 1) associated with a transaction (e.g., the transaction 22 shown in FIG. 1).

As represented by block 430, in various implementations, the method 400 includes synthesizing a timestamp (e.g., the timestamp 26 shown in FIG. 1) based on the clock. In various implementations, the timestamp indicates a time that associates the transaction with the network node. As represented by block 430a, in various implementations, the timestamp indicates a time at which the network node received the transaction. As represented by block 430b, in various implementations, the method 400 includes determining whether the transaction request satisfies a transaction validation criterion ("validation criterion", hereinafter for the sake of brevity). For example, in some implementations, the method 400 includes determining whether the transaction includes sufficient transaction data to be processed. As represented by block 430c, in various implementations, the timestamp indicates a time at which the network node validated the transaction In some implementations, the method 400 includes transmitting the timestamp to at least another network node that maintains the distributed ledger in coordination with the network node that synthesized the timestamp. In some examples, the method 400 includes transmitting (e.g., broadcasting) the timestamp to all other network nodes that maintain the distributed ledger in coordination with the network node that synthesized the timestamp. In some implementations, the method 400 includes synthesizing a digital signature by cryptographically signing the timestamp or a hash of the timestamp with a private key. In such implementations, the method 400 includes transmitting the digital signature to at least another network node that maintains the distributed ledger in coordination with the network node that synthesized the timestamp. In some implementations, the method 400 includes transmitting the transaction indicator (e.g., the transaction) and the timestamp to at least another network node that maintains the distributed ledger in coordination with the network node that synthesized the timestamp.

Figure 4B:
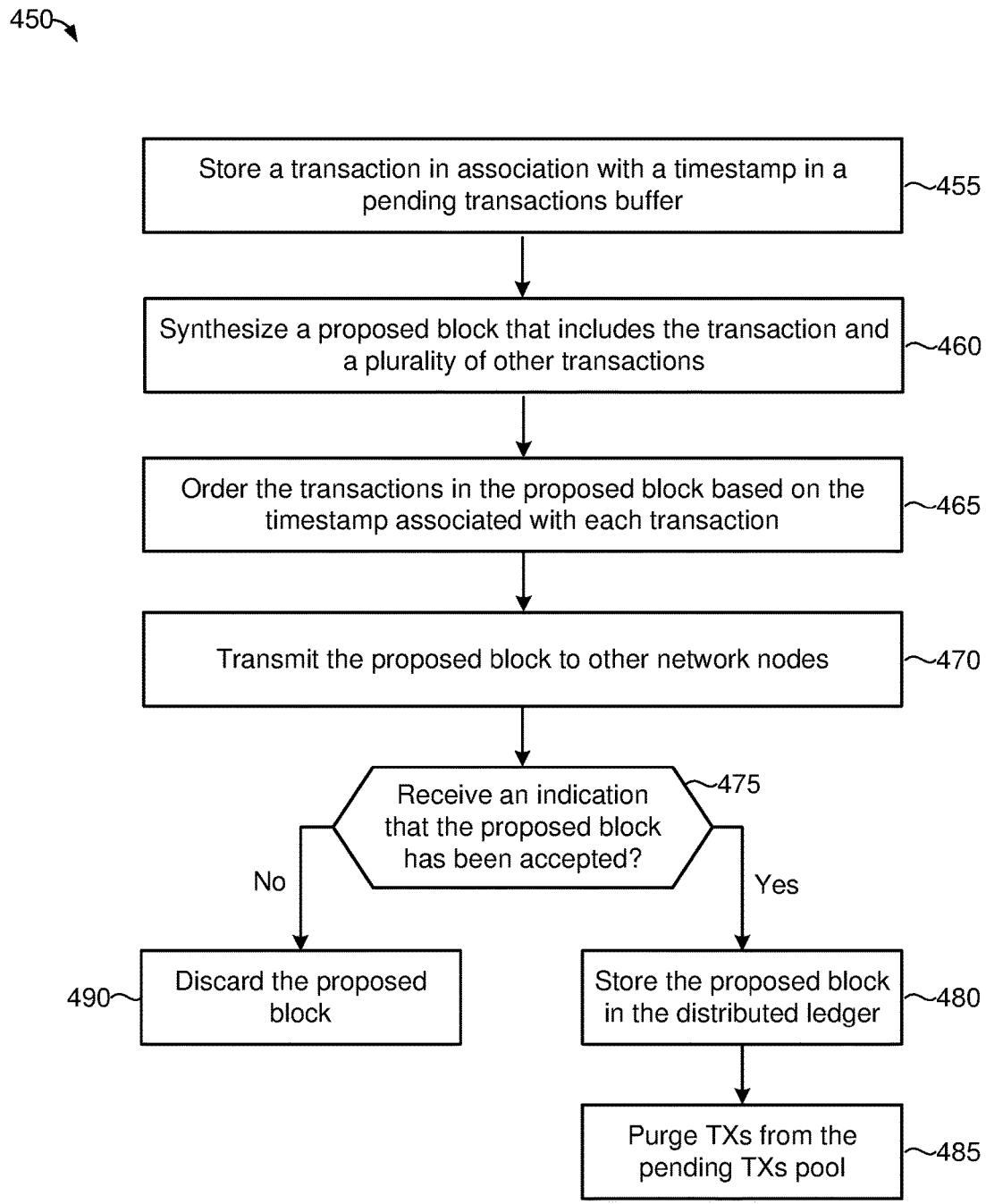
FIG. 4B is a flowchart representation of a method of ordering transactions in a distributed ledger in accordance with some implementations.

FIG. 4B is a flowchart representation of a method 450 of ordering transactions in a distributed ledger in accordance with some implementations. In various implementations, the method 450 is implemented as a set of computer readable instructions that are executed at a network node (e.g., the network node 100 shown in FIGS. 1 and 2A-C). Briefly, the method 400 includes synthesizing a proposed block, ordering transactions within the proposed block based on their corresponding timestamps, transmitting the block proposal, and storing the proposed block in the distributed ledger in response to receiving an indication that the block proposal has been accepted.

As represented by block 455, in various implementations, the method 450 includes storing a transaction (e.g., the transaction 22 shown in FIGS. 1 and 2A-C) in association with a timestamp (e.g., the timestamp 26 shown in FIGS. 1 and 2A-C) in a transaction buffer (e.g., the transaction buffer 120 shown in FIGS. 1 and 2A-C). In various implementations, the method 450 includes storing the transaction in the transaction buffer after receiving a transaction request (e.g., the transaction request 21 shown in FIGS. 1 and 2A) from a client device (e.g., the client device 20 shown in FIGS. 1 and 2A). In various implementations, the method 450 includes storing the transaction in the transaction buffer in response to validating the transaction. For example, in some implementations, the method 450 includes storing the transaction in the transaction buffer in response to determining that the transaction satisfies a validation criterion (e.g., the transaction includes sufficient transaction data to be processed).

As represented by block 460, in various implementations, the method 450 includes synthesizing a block proposal (e.g., the block proposal 152 shown in FIG. 2C) that indicates (e.g., includes) a proposed block that includes transactions that are stored in the transaction buffer. In various implementations, the method 450 includes selecting transactions from the transaction buffer based on the timestamps associated with the transactions. For example, in some implementations, the method 450 includes selecting transactions that are associated with the oldest timestamps. In some examples, the method 450 includes including transactions into the proposed block on a first-in-first-out (FIFO) basis. In some implementations, the method 450 includes selecting transactions that are associated with later timestamps. In some examples, the method 450 includes including transactions into the proposed block on a last-in-first-out (LIFO) basis. Those of ordinary skill in the art will appreciate from the present disclosure that other transaction selection techniques are also contemplated.

As represented by block 465, in various implementations, the method 450 includes ordering the transactions within the proposed block based on the timestamps associated with the transactions. For example, in some implementations, the method 450 includes ordering the transactions such that transactions with earlier timestamps are listed towards the beginning of the proposed block, and transactions with later timestamps are listed towards the end of the proposed block. In some implementations, the method 450 includes ordering the transactions such that transactions with later timestamps are listed towards the beginning of the proposed block, and transactions with earlier timestamps are listed towards the end of the proposed block. Those of ordinary skill in the art will appreciate from the present disclosure that other transaction ordering techniques are also contemplated.

As represented by block 470, in various implementations, the method 450 includes transmitting the block proposal to other network nodes in the distributed ledger system. In some implementations, the method 450 includes utilizing a cryptographic hash function (e.g., SHA-256) to generate a digest. In some examples, the method 450 includes inputting the proposed block and a number (e.g., a random number or a pseudo-random number) into the cryptographic hash function to generate the digest. In some implementations, the method 450 includes determining whether the digest satisfies a digest criterion. In some examples, the digest criterion specifies that the digest include a particular number of leading zeros. In such examples, the method 450 includes determining whether the digest includes the particular number of leading zeros. In various implementations, the method 450 includes transmitting the block proposal to the other network nodes in response to determining that the digest satisfies the digest criterion. In various implementations, the method 450 includes determining that the digest does not satisfy the digest criterion, and generating a new digest by selecting a different number (e.g., by incrementing the previous number).

As represented by block 475, in various implementations, the method 450 includes receiving an indication that indicates whether the block proposal has been accepted or rejected. In some implementations, the method 450 includes receiving an indication that indicates that the block proposal has been accepted (e.g., receiving the proposal acceptance 154 shown in FIG. 2C). In such implementations, the method 450 proceeds to block 480. In some implementations, the method 450 includes receiving an indication that indicates that the block proposal has been rejected (e.g., receiving the proposal rejection 156 shown in FIG. 2C). In such implementations, the method 450 proceeds to block 490. As represented by block 480, in various implementations, the method 450 includes storing the proposed block in the distributed ledger. As represented by block 485, in various implementations, the method 450 includes purging the transactions that were in the proposed block from the transaction buffer. As represented by block 490, in various implementations, the method 450 includes discarding the proposed block.

In some implementations, the method 400 includes, at at least another network node (e.g., at each network node) that maintains the distributed ledger, synthesizing a timestamp for the transaction. In some examples, the arrival time of the transaction indicator is different for different network nodes. For example, some network nodes receive the transaction indicator sooner than other network nodes. As such, in some examples, before a transaction is recorded in the distributed ledger, the transaction is associated with multiple timestamps. However, in some implementations, once the transaction is recorded in the distributed ledger, the transaction is associated with the timestamp synthesized by the network node that recorded the transaction in the distributed ledger.

Figure 5:
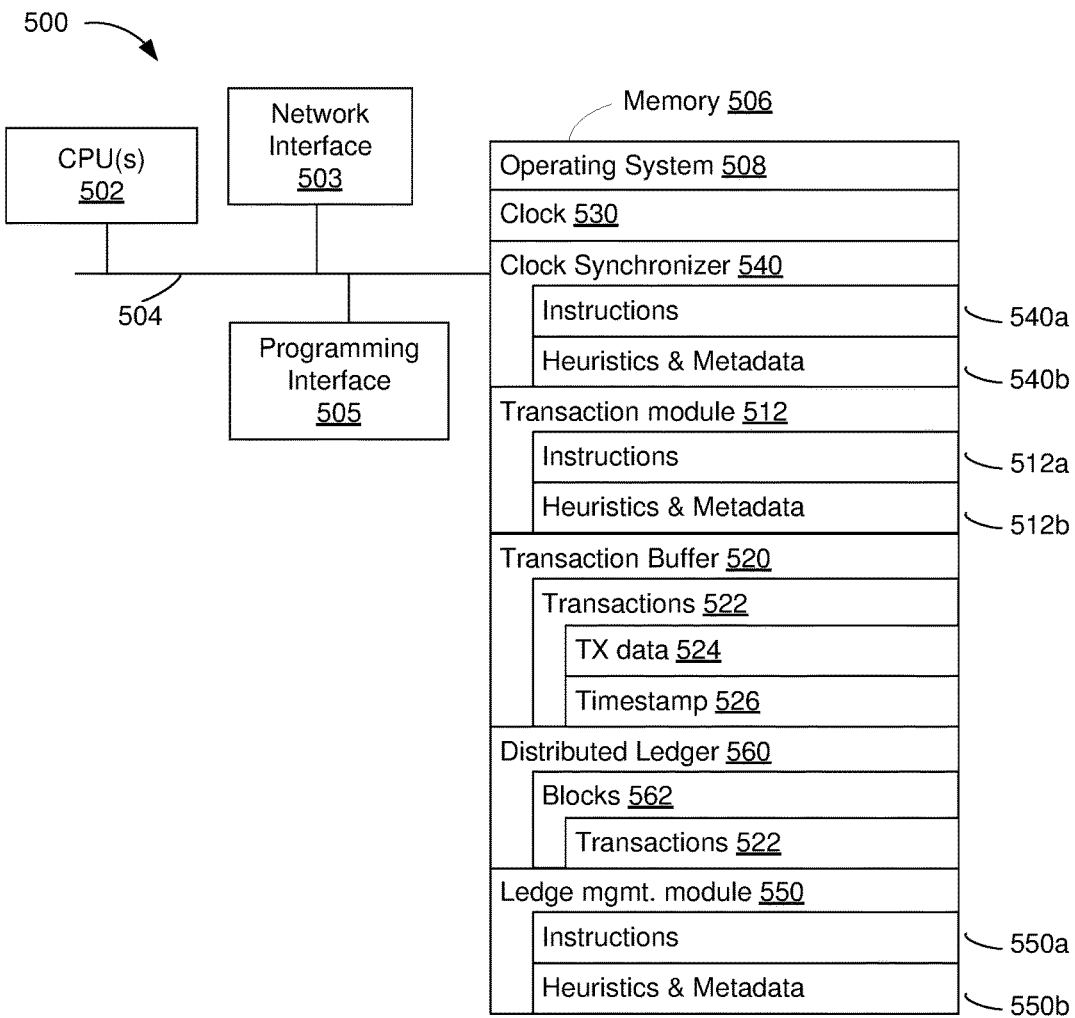
FIG. 5 is a block diagram of a server system enabled with various modules that are provided to synthesize timestamps for transactions, and order the transactions in a distributed ledger in accordance with some implementations.

FIG. 5 is a block diagram of a server system 500 enabled with one or more components of a network node (e.g., the network node shown in FIGS. 1 and 2A-C) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 502, a network interface 503, a programming interface 505, a memory 506, and one or more communication buses 504 for interconnecting these and various other components.

In some implementations, the network interface 503 is provided to, among other uses, establish and maintain a metadata tunnel between a cloud hosted network management system and at least one private network including one or more compliant devices. In some implementations, the communication buses 504 include circuitry that interconnects and controls communications between system components. The memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506 comprises a non-transitory computer readable storage medium.

In some implementations, the memory 506 or the non-transitory computer readable storage medium of the memory 506 stores the following programs, modules and data structures, or a subset thereof including an optional operating system 508, a transaction module 512, a transaction buffer 520, a clock 530, a clock synchronizer 540, a ledger management module 550, and a distributed ledger 560. In various implementations, the transaction module 512, the transaction buffer 520, the clock 530, the clock synchronizer 540, the ledger management module 550, and the distributed ledger 560 are similar to the transaction module 112, the transaction buffer 120, the clock 130, the clock synchronizer 140, the ledger management module 150, and the distributed ledger 160, respectively, shown in FIG. 2A. In various implementations, the transaction buffer 520 stores transactions 522 that are similar to the transactions 22 shown in FIGS. 1 and 2A-C. In various implementations, the transactions 522 include transaction data 524 that is similar to the transaction data 24 shown in FIGS. 1 and 2A-C. In various implementations, a transaction 522 is associated with a timestamp 524 that is similar to the timestamp 24 shown in FIGS. 1 and 2A-C. In various implementations, the distributed ledger 560 includes various blocks 562 that are similar to the blocks 162 shown in FIGS. 2C and 3. In various implementations, a block 562 stores a list of transactions 522.

In various implementations, the clock synchronizer 540 synchronizes the clock 530 with other clocks maintained by other server systems (e.g., by other network nodes 110 of the distributed ledger system 100 shown in FIG. 1). In various implementations, the clock synchronizer 540 synchronizes the clock 530 based on a clock synchronization signal (e.g., the clock synchronization signal 142 shown in FIGS. 2A-C). To that end, in various implementations, the clock synchronizer 540 includes instructions and/or logic 540a, and heuristics and metadata 540b. In various implementations, the transaction module 512 obtains a transaction 522, synthesizes a timestamp 526 for the transaction 522 based on the clock 530, and stores the transaction 522 along with the timestamp 526 in the transaction buffer 520. To that end, in various implementations, the transaction module 512 includes instructions and/or logic 512a, and heuristics and metadata 512b. In various implementations, the ledger management module 550 synthesizes a proposed block for the distributed ledger 560. In various implementations, the proposed block includes transactions 522 from the transaction buffer 520. In various implementations, the ledger management module 550 includes transactions 522 in the proposed block based on the timestamps 526. To that end, in various implementations, the ledger management module 550 includes instructions and/or logic 550a, and heuristics and metadata 550b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a first network node configured to maintain a distributed ledger in coordination with a plurality of network nodes, the first network node including one or more processors, a non-transitory memory and one or more network interfaces:
      synchronizing a first clock of the first network node with respective clocks maintained by one or more of the plurality of network nodes;
      obtaining a transaction indicator including respective transaction data for a transaction;
      synthesizing, by the first network node, a timestamp for the transaction based on the first clock, wherein the timestamp indicates a time that associates the first network node to the transaction;
      synthesizing a proposed block for the distributed ledger, wherein the proposed block includes the transaction and a plurality of other transactions that are ordered chronologically based on the timestamp associated with the transaction and timestamps associated with the plurality of other transactions;
      transmitting the proposed block to the plurality of network nodes;
      receiving an indication that a majority of the plurality of network nodes have accepted the proposed block; and
      storing the proposed block in the distributed ledger in response to receiving the indication.

2. The method of claim 1, wherein synchronizing the first clock comprises:
   determining that the first clock is unsynchronized with one or more of the clocks maintained by the plurality of network nodes; and
   synchronizing the first clock in response to detecting that the first clock 1 s unsynchronized.

3. The method of claim 1, wherein synchronizing the first clock comprises:
   receiving a signal to synchronize the first clock; and
   adjusting the first clock based on the signal.

4. The method of claim 1, wherein the transaction indicator comprises a request to transfer an asset between the client device and another client device.

5. The method of claim 1, further comprising:
   determining whether the transaction indicator satisfies a transaction validation criterion; and
   synthesizing the timestamp in response to determining that the transaction indicator satisfies the transaction validation criterion.

6. The method of claim 1, further comprising:
   storing the transaction indicator in association with the timestamp in a pending-transactions buffer at the first network node.

7. The method of claim 1, further comprising:
   purging the transactions that are in the proposed block from a pending-transactions buffer in response to storing the proposed block in the distributed ledger.

8. The method of claim 1, further comprising:
   receiving an indication that a majority of the plurality of network nodes have rejected the proposed block; and
   discarding the proposed block.

9. The method of claim 1, further comprising:
   cryptographically signing the timestamp with a private key.

10. The method of claim 1, further comprising:
    transmitting the timestamp to one or more of the plurality of network nodes that maintain the distributed ledger in coordination with the first network node.

11. The method of claim 1, further comprising:
    at a second network node configured to maintain the distributed ledger in coordination with the plurality of network nodes, the second network node including one or more processors, a non-transitory memory and one or more network interfaces:
       synchronizing a second clock of the second network node with the respective clocks maintained by one or more of the plurality of network nodes;
       obtaining the transaction indicator including respective transaction data for the transaction; and
       synthesizing, by the second network node, another timestamp for the transaction based on the second clock, wherein the other timestamp indicates a time that associates the second network node to the transaction.

12. A network node configured to maintain a distributed ledger in coordination with a plurality of network nodes, the network node comprising:
    a processor configured to execute computer readable instructions included on a non-transitory memory; and
    a non-transitory memory including computer readable instructions, that when executed by the processor, cause the network node to:
       synchronize a first clock of the network node with respective clocks maintained by one or more of the plurality of network nodes;
       obtain a transaction indicator including respective transaction data for a transaction;

synthesize, by the network node, a timestamp for the transaction based on the first clock, wherein the timestamp indicates a time that associates the network node to the transaction; and synthesize a proposed block for the distributed ledger, wherein the proposed block includes the transaction and a plurality of other transactions that are ordered chronologically based on the timestamp associated with the transaction and timestamps associated with the plurality of other transactions;

transmit the proposed block to the plurality of network nodes;

receive an indication that a majority of the plurality of network nodes have accepted the proposed block; and store the proposed block in the distributed ledger in response to receiving the indication.

13. The network node of claim 12, wherein synchronizing the first clock comprises:

determining that the first clock is unsynchronized with one or more of the clocks maintained by the plurality of network nodes; and synchronizing the first clock in response to detecting that the first clock is unsynchronized.

14. The network node of claim 12, wherein synchronizing the first clock comprises:

receiving a signal to synchronize the first clock; and
adjusting the first clock based on the signal.

15. The network node of claim 12, wherein the computer readable instructions further cause the network node to:

determine whether the transaction indicator satisfies a transaction validation criterion; and synthesize the timestamp in response to determining that the transaction indicator satisfies the transaction validation criterion.

16. A distributed ledger system comprising:

a plurality of network nodes that are configured to maintain a distributed ledger in coordination with each other, wherein a first network node of the plurality of network nodes comprises:

a processor configured to execute computer readable instructions included on a non-transitory memory; and a non-transitory memory including computer readable instructions, that when executed by the processor, cause the first network node to:

synchronize a first clock of the first network node with respective clocks maintained by one or more of the plurality of network nodes;

obtain a transaction indicator including respective transaction data for a transaction;

synthesize, by the first network node, a timestamp for the transaction based on the first clock, wherein the timestamp indicates a time that associates the first network node to the transaction; and synthesize a proposed block for the distributed ledger, wherein the proposed block includes the transaction and a plurality of other transactions that are ordered chronologically based on the timestamp associated with the transaction and timestamps associated with the plurality of other transactions;

transmit the proposed block to the plurality of network nodes;

receive an indication that a majority of the plurality of network nodes have accepted the proposed block; and store the proposed block in the distributed ledger in response to receiving the indication.

17. The distributed ledger system of claim 16, wherein the computer readable instructions, when executed by the processor, further cause the first network node to:

purge the transactions that are in the proposed block from a pending-transactions buffer in response to storing the proposed block in the distributed ledger.

18. The distributed ledger system of claim 16, wherein the computer readable instructions, when executed by the processor, further cause the first network node to:

receive an indication that a majority of the plurality of network nodes have rejected the proposed block; and
discard the proposed block.

19. The distributed ledger system of claim 16, wherein the computer readable instructions, when executed by the processor, further cause the first network node to:

cryptographically sign the timestamp with a private key.

20. The distributed ledger system of claim 16, wherein the computer readable instructions, when executed by the processor, further cause the first network node to:

transmit the timestamp to one or more of the plurality of network nodes that maintain the distributed ledger in coordination with the first network node.

* * * * *